United States Patent
Yee et al.

(10) Patent No.: US 7,891,744 B2
(45) Date of Patent: Feb. 22, 2011

(54) VEHICLE WHEEL COVER RETENTION SYSTEM AND METHOD FOR PRODUCING SAME

(75) Inventors: Peter Yee, Sunnyvale, CA (US); Joseph Wolf, Canton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 55 days.

(21) Appl. No.: 12/161,993

(22) PCT Filed: Jan. 29, 2007

(86) PCT No.: PCT/US2007/002417

§ 371 (c)(1),
(2), (4) Date: Feb. 20, 2009

(87) PCT Pub. No.: WO2007/092201

PCT Pub. Date: Aug. 16, 2007

(65) Prior Publication Data
US 2009/0302669 A1 Dec. 10, 2009

(51) Int. Cl.
*B60B 7/06* (2006.01)
(52) U.S. Cl. .................. 301/37.11; 301/37.43
(58) Field of Classification Search ............. 301/37.11, 301/37.43, 37.101, 37.102, 37.108
See application file for complete search history.

(56) References Cited

U.S. PATENT DOCUMENTS

| | | | | |
|---|---|---|---|---|
| 4,386,982 A * | 6/1983 | Weinhaus | ..................... | 156/79 |
| 5,709,828 A * | 1/1998 | Bemis et al. | ................ | 264/46.5 |
| 5,820,225 A * | 10/1998 | Ferriss et al. | ........... | 301/37.371 |
| 5,845,973 A * | 12/1998 | Chase | ..................... | 301/37.43 |
| 5,922,431 A | 7/1999 | Funato et al. | | |
| 5,945,200 A * | 8/1999 | Suzuki | ....................... | 428/192 |
| 6,123,356 A * | 9/2000 | Gray et al. | ............... | 280/728.3 |
| 6,270,167 B1 * | 8/2001 | Kemmerer et al. | ........ | 301/37.43 |
| 6,729,695 B2 | 5/2004 | Woelfel | | |
| 6,752,469 B1 * | 6/2004 | Cutcher et al. | ........... | 301/37.11 |
| 6,779,852 B2 * | 8/2004 | Van Houten et al. | ..... | 301/37.43 |
| 6,991,841 B2 * | 1/2006 | Cowelchuk et al. | ........... | 428/71 |
| 7,029,610 B2 * | 4/2006 | Miyakawa et al. | ......... | 264/46.4 |
| 7,097,730 B2 * | 8/2006 | Woelfel et al. | .............. | 156/290 |
| 7,204,562 B2 * | 4/2007 | Gerard | .................... | 301/37.43 |
| 7,332,207 B2 * | 2/2008 | Bondar et al. | .................. | 428/71 |
| 7,393,062 B1 * | 7/2008 | Heck et al. | ............... | 301/37.35 |

(Continued)

*Primary Examiner*—Russell D Stormer
(74) *Attorney, Agent, or Firm*—MacMillan, Sobanski & Todd, LLC (57) ABSTRACT

A method for producing a vehicle wheel comprises the steps of: (a) providing a wheel including an outboard face; (b) providing a wheel cover including an inner surface; (c) providing an external surface feature on at least one of the outboard face of the wheel and the inner surface of the cover; (d) positioning the wheel and the cover relative to one another to form a first gap between at least selected portions of the wheel outboard face of the cover inner surface and to form at least a second gap in the area of the external surface feature between adjacent surfaces of the wheel and the wheel cover, the first gap to the second gap defining an indirect flow path; and (e) securing the cover to the wheel by using an expandable foam adhesive material, wherein the adhesive material initially fills selected portions of the first gap and then follows the indirect flow path to then flow into the second gap whereby the adhesive material cures and stops expanding before completely filling the second gap.

20 Claims, 5 Drawing Sheets

U.S. PATENT DOCUMENTS

| | | | |
|---|---|---|---|
| 7,416,260 B1 * | 8/2008 | Cuevas et al. | 301/37.43 |
| 7,448,695 B1 * | 11/2008 | Wolf | 301/37.31 |
| 2002/0093242 A1 * | 7/2002 | Chase et al. | 301/37.43 |
| 2004/0164606 A1 * | 8/2004 | Chase | 301/37.11 |
| 2004/0166302 A1 * | 8/2004 | Lee et al. | 428/304.4 |
| 2005/0248211 A1 * | 11/2005 | Chase | 301/37.43 |
| 2006/0043782 A1 * | 3/2006 | Houten | 301/37.43 |

\* cited by examiner

VEHICLE WHEEL COVER RETENTION SYSTEM AND METHOD FOR PRODUCING SAME

BACKGROUND OF THE INVENTION

This invention relates in general to vehicle wheels and, in particular, to an improved vehicle wheel cover-retention system and method for producing the same.

Automotive wheels serve two main purposes: the wheels support the vehicle and associated tires and the wheels provide an aesthetically pleasing appearance. Current technology often involves tradeoffs between those two goals. Wheels are typically constructed of metal or metal alloys, although alternative materials, such as composites, are envisioned. The aesthetic appearance of such a wheel is limited by manufacturing methods to form a given styled surface. Additionally, such a wheel will often have excess material (and weight) added to form the styled surface.

Wheel clads or covers are used to simulate a styled wheel surface while utilizing a structural wheel underneath to support any loads imparted on the wheel. The wheel cover is typically made of a plastic or thin metal material that is more easily formable into pleasing aesthetic shapes. The cover is then attached to the wheel by mechanical means, whether fasteners, adhesives or locking features formed into the cover or the wheel. The cover can also receive a special surface coating to enhance its appearance, such as a bright paint or chrome plating. It is desirable that the cover is not easily discernible as separate from the wheel. It is also desirable to eliminate evidence of a cover being used such as mating lines, a hollow sound when tapped, yielding to moderate pressure, preventing the entry of foreign matter between the parts and visible wheel surfaces behind the cover. To this end, a suitable adhesive foam material is often used to deaden the hollow sound when tapped, fill the space between the wheel and cover to prevent entry of foreign matter and support the cover when pressure is applied to the cover.

It can be very difficult to use adhesives to join the cover and the wheel in a high volume manufacturing environment because the adhesive requires sufficient time for a chemical reaction to occur and expand (in the case of foam adhesives), attain handling strength and subsequently full strength. A fast curing adhesive will allow faster throughput but also cures quickly in the mixing equipment and requires more maintenance. Conversely, a slow curing adhesive possesses a longer open time before clogging inside the dispensing equipment but requires more work-in-process inventory and related resources, such as, floor space, cure ovens, material handling equipment and tooling.

Furthermore, when using an expanding foam adhesive material, the cover and wheel assembly can be encapsulated inside a masking mold to contain the expanding foam adhesive material. However, there often exists a path internal to the cover and wheel assembly through which it is undesirable to allow the expanding foam adhesive material to enter. It is not feasible to mask off certain areas when the cover and wheel are assembled.

SUMMARY OF THE INVENTION

This invention relates to a vehicle wheel cover retention system and method for producing such a vehicle wheel.

According to one embodiment, the method for producing the vehicle wheel comprising the steps of: (a) providing a vehicle wheel defining an axis and formed from a suitable material and including a wheel rim and a wheel disc, the vehicle wheel including an outboard face; (b) providing a wheel cover formed from a suitable material and including an inner surface and an outer surface; (c) providing an external surface feature on at least one of the outboard face of the vehicle wheel and the inner surface of the wheel cover; (d) positioning the vehicle wheel and the wheel cover relative to one another to form a first gap between at least selected portions of the outboard face of the vehicle wheel and the inner surface of the wheel cover and to form at least a second gap in the area of the external surface feature between adjacent surfaces of the vehicle wheel and the wheel cover, the first gap to the second gap defining an indirect flow path; and (e) securing the wheel cover to the vehicle wheel by using an expandable foam adhesive material, wherein the expandable foam adhesive material initially fills selected portions of the first gap and then follows the indirect flow path to then flow into the second gap whereby the expanding adhesive foam material cures and stops expanding before completely filling the second gap.

According to another embodiment, the method for producing the vehicle wheel comprising the steps of: (a) providing a vehicle wheel defining an axis and formed from a suitable material and including a wheel rim and a wheel disc, the vehicle wheel including an outboard face; (b) providing a wheel cover formed from a suitable material and including an inner surface and an outer surface; (c) providing an inboard external surface feature on at least one of the outboard face of the vehicle wheel and the inner surface of the wheel cover; (d) providing an outboard external surface feature on the inner surface of the wheel cover; (e) positioning the vehicle wheel and the wheel cover relative to one another to form a first gap between at least selected portions of the outboard face of the vehicle wheel and the inner surface of the wheel cover and to form at least a second gap in the area of the inboard external surface feature between adjacent surfaces of the vehicle wheel and the wheel cover and a third gap in the area of the outboard external surface between adjacent surfaces of the vehicle wheel and the wheel cover, the first gap to the second gap defining a first indirect flow path and the first gap to the third gap defining a second indirect flow path; and (f) securing the wheel cover to the vehicle wheel by using an expandable foam adhesive material, wherein the expandable foam adhesive material initially fills selected portions of the first gap and then follows the first indirect flow path to then flow into the second gap, whereby the expanding adhesive foam material cures and stops expanding before completely filling the second gap, and at the same time, then follows the second indirect flow path to then flow into the third gap, whereby the expanding adhesive foam material cures and stops expanding before completely filling the third gap.

According to one embodiment, the vehicle wheel cover retention system comprises: a wheel defining an axis and formed from a suitable material and including a wheel rim and a wheel disc, the wheel including an outboard face; a wheel cover formed from a suitable material and including an inner surface and an outer surface; and an expandable foam adhesive disposed between at least a portion of the outboard face of the wheel and the inner surface of the wheel cover; wherein the vehicle wheel and the wheel cover include a first gap between at least selected portions of the outboard face of the vehicle wheel and the inner surface of the wheel cover and at least a second gap in the area of the external surface feature between adjacent surfaces of the vehicle wheel and the wheel cover, the first gap to the second gap defining an indirect flow path such that the expandable foam adhesive material initially fills selected portions of the first gap and then follows the indirect flow path to then flow into the second gap whereby the expanding adhesive foam material cures and stops expanding before completely filling second gap.

Other advantages of this invention will become apparent to those skilled in the art from the following detailed description of the invention, when read in light of the accompanying drawings.

DETAILED DESCRIPTION OF THE INVENTION

Figure 1:
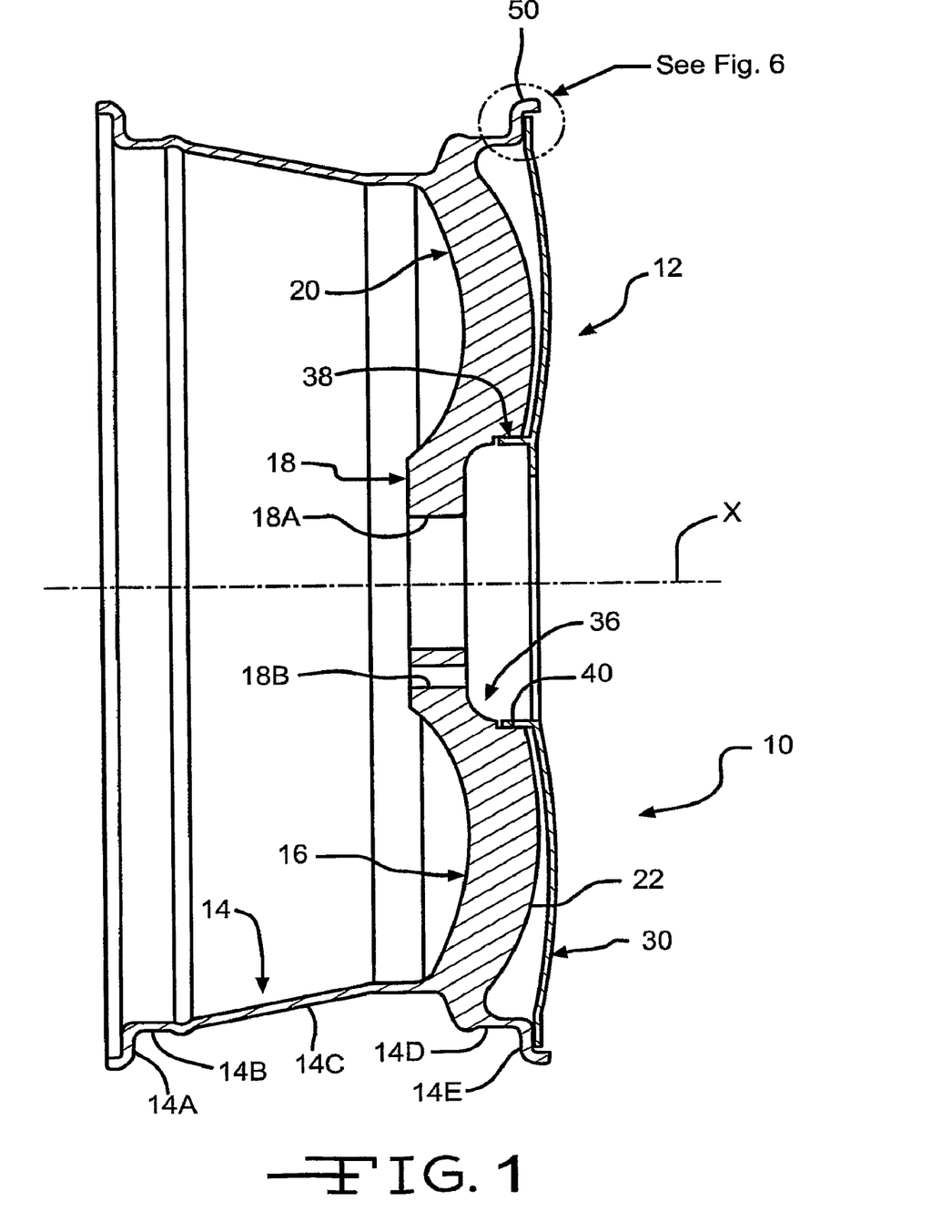
FIG. 1 is a view of a portion of a vehicle wheel including a first embodiment of a vehicle wheel cover retention system, the vehicle wheel being shown without any adhesive material present.
Figure 2:
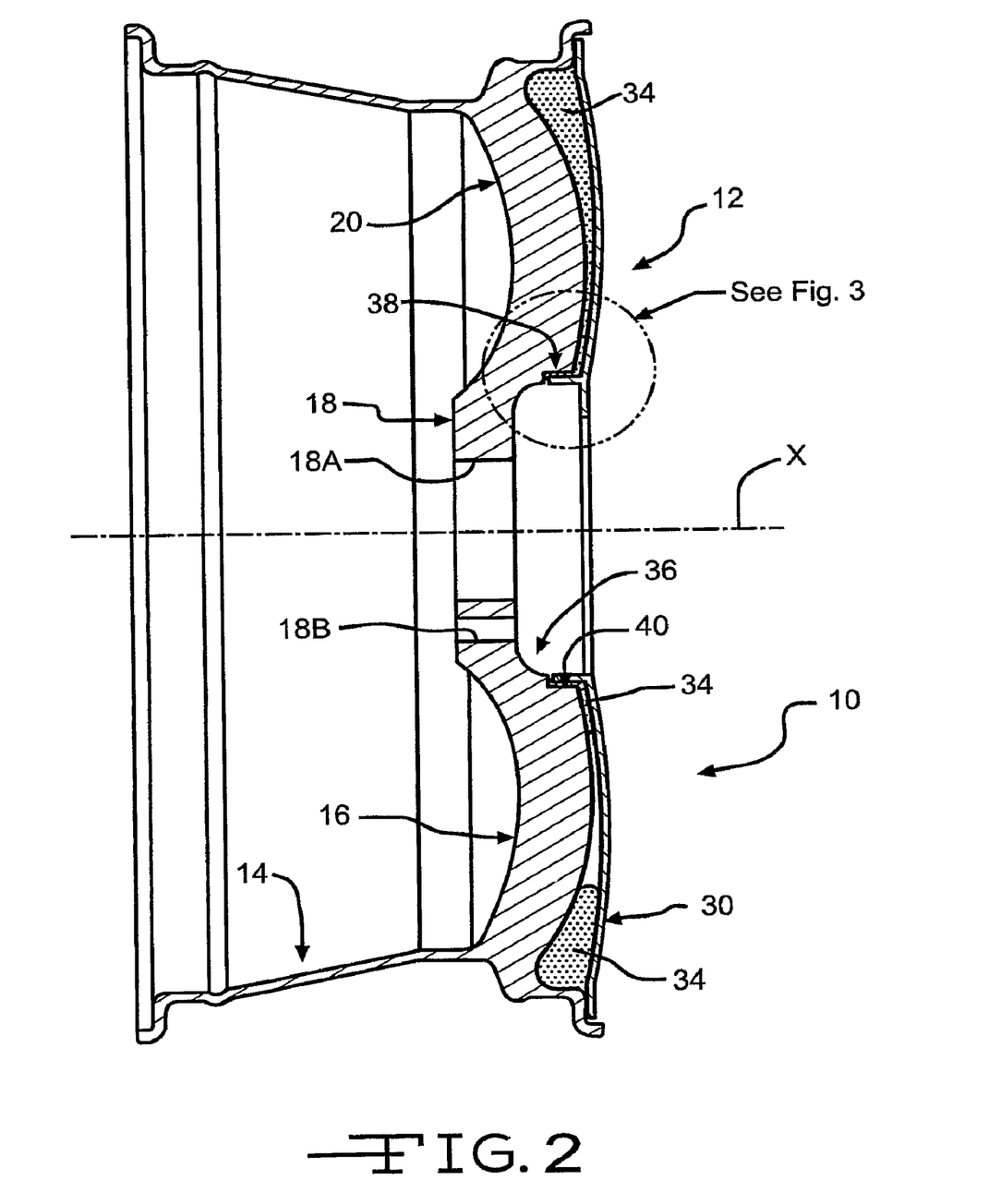
FIG. 2 is a view similar to that shown in FIG. 1, but showing the adhesive material present.

Referring now to the drawings, there is illustrated in FIGS. 1 and 2 a view of a portion of a vehicle wheel, indicated generally at 10, including a first embodiment of a vehicle wheel cover retention system, indicated generally at 12. As shown therein, the vehicle wheel 10 defines an axis X and may be of any suitable type of material or materials, such as for example, steel, aluminum and alloys thereof, and may be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Wei et al., a "modular wheel" construction such as shown in U.S. Pat. No. 5,360,261 to Archibald et al., a cast aluminum wheel such as shown in U.S. Pat. No. 5,340,418 to Wei, or a euroflange type of wheel such as shown in U.S. Pat. No. 5,564,792 to Archibald, the disclosures of all of these patents incorporated by reference in entirety herein.

In the illustrated embodiment the vehicle wheel 10 is a one-piece full cast aluminum wheel and includes a wheel rim, indicated generally at 14, and a wheel disc, indicated generally at 16. The wheel rim 14 includes an inboard tire bead seat retaining flange 14A, and inboard tire bead seat 14B, a generally axially extending well 14C, and outboard tire bead seat 14D, and an outboard tire bead seat retaining flange 14E. Alternatively, the construction, material and/or make-up of the wheel rim 14 may be other than illustrated if so desired.

The wheel disc 16 includes a generally centrally located inner wheel mounting surface or portion 18, an outer annular portion 20, and defines an outer surface or outboard face 22. The inner mounting surface 18 of the wheel disc 16 is provided with a center hub hole 18A and a plurality of lug bolt mounting holes 18B spaced circumferentially around the center hub hole 18A (one of such lug bolt mounting holes 18B illustrated in FIGS. 1 and 2). The lug bolt receiving holes 18B are adapted to receive lug bolts (not shown) and nuts (not shown) for securing the vehicle wheel 10 on an axle (not shown) of a vehicle.

In the illustrated embodiment, the wheel cover 30 is formed from plastic and is a one-piece wheel cover and may have at least an outer surface which is painted, chrome-plated or otherwise adorned or decorated as desired. Alternatively, the wheel cover 30 may be formed from other materials, such as metal and/or may be a multi-piece wheel cover formed of like or unlike materials if so desired. The wheel cover 30 may have an inner surface which closely conforms to the outboard face of the wheel, may have an inner surface which is spaced from the outboard face of the wheel to impart the styling to the wheel, or may have a combination of both an inner surface which conforms and an inner surface which is spaced apart from the outboard face of the wheel.

As will be discussed below, the wheel cover 30 is provided having internal baffles or ribs which are operative to create a serpentine or indirect path that will restrict or reduce the entry of an expanding foam adhesive material 34 into certain areas between the vehicle wheel 10 and the wheel cover 16, such as a wheel hub area, indicated generally at 36, adjacent to lug bolt mounting holes 18A. The expanding foam adhesive material 34 generates some internal pressure (about 10 psi gage) and can pass through a gap that is relatively small (about three (3) mm tall or greater), rather easily. At very small gap heights (roughly about 0.5 mm), the expanding foam adhesive material 34 will encounter significant resistance trying to penetrate the gap.

Figures 3, 4:
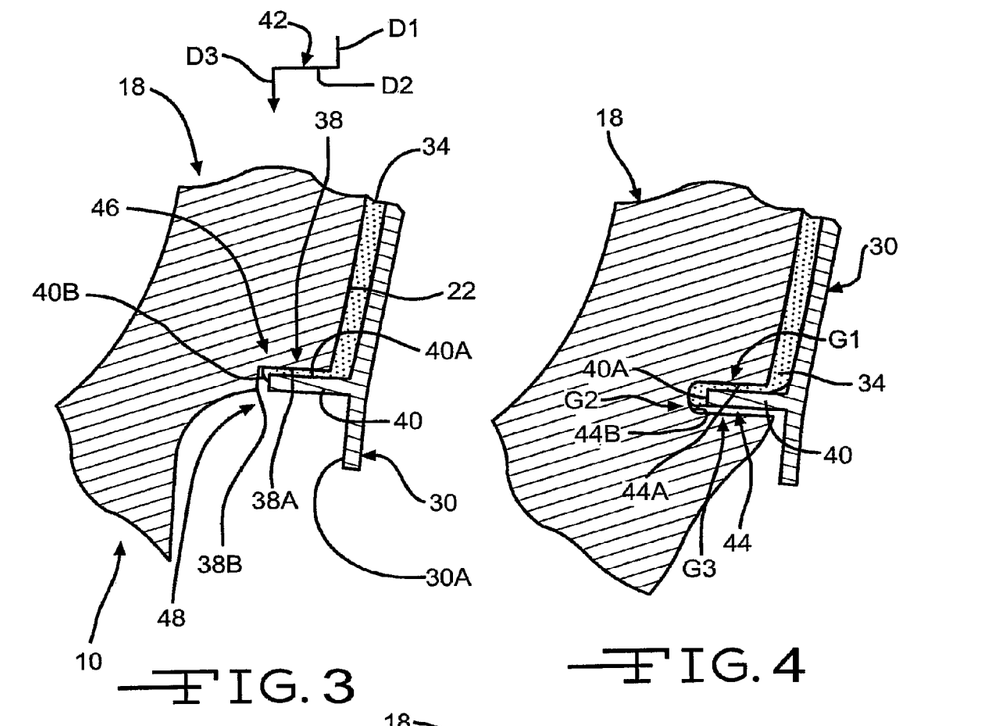
FIG. 3 is an enlarged view of a portion of the vehicle wheel illustrated in FIG. 2.
FIG. 4 is a view similar to FIG. 2 showing an alternate embodiment.

During the time that the foam adhesive material 34 is expanding and curing, some foam adhesive material 34 will progress through the indirect path but at a slow rate such that the foam adhesive material 34 will stop expanding in the indirect path or shortly after exiting it. By creating an indirect path for the expanding foam adhesive material 34, the foam material's fill path can be controlled without having a perfect seal or interface between the wheel cover 30 and the vehicle wheel 10. In the illustrated embodiment, the indirect path is preferably created by forming or molding the baffles or ribs into the wheel cover 30 and by controlling an outer profile or surface on the outboard face 22 of the vehicle wheel 10 that the wheel cover 30 is to cover. Some possible embodiments of the indirect path are as follows:

For example, as shown in the embodiment shown in FIG. 3, the inner mounting surface 18 in the wheel hub area 36 of the vehicle wheel 10 is provided with a revolved or stepped annular ledge or shoulder, indicated generally at 38, and the wheel cover 30 is provided with a baffle or rib 40. The shoulder 38 is provided at that portion wherein the wheel outboard face 22 goes from high-to-low or low-to-high position. In this embodiment, the rib 40 is preferably a continuous circumferentially extending annular rib and extends generally axially inwardly from an inner surface 30A of the wheel cover 30. As shown in the upper half of FIGS. 1 and 2, the wheel cover 30 may extend inwardly relative to the rib 40 or as shown in the lower half of FIGS. 1 and 2, the wheel cover 30 may end adjacent the rib 40. Also, the vehicle wheel 10 may have a center cap (not shown) which is adapted to cover the wheel hub area 36 of the wheel 10. The center cap may be releasably attached to the vehicle wheel 10 and/or the wheel cover 30 by suitable means.

As shown in the illustrated embodiment, the rib 40 includes a generally axially extending outer surface 40A and a remote end 40B. Preferably, the outer surface 40A is positioned adjacent or near a generally axially extending side wall surface 38A of the shoulder 38 and the remote end 40B is spaced apart from contact with a generally radially extending surface 38B of the shoulder 38 to thereby produce an indirect path, as generally indicated by arrow 42 in FIG. 3.

In this embodiment the indirect path 42 is generally Z-shaped and is defined by the outboard face 22 of the wheel 10 and the surfaces 38A and 38B of the shoulder 38 of the wheel 10 in conjunction with the adjacent surfaces of the wheel cover 30, namely the inner surface 30A and the outer surface 40A and the remote end 40B of the rib 40. Thus, it can be seen that the indirect path 42 in this embodiment preferably extends in at least three directions for a purpose to be discussed below. Namely, the indirect path 42 extends first in a generally radially inwardly extending direction D1 (i.e., generally along surface 22), second in a generally axially inwardly extending direction D2 (i.e., generally along surface 38A), and lastly in a generally radially inwardly extending direction D3 (i.e., generally along surface 38B).

In this embodiment, as a result of the indirect path 42, as the foam adhesive material 34 is expanding, any foam adhesive material 34 that flows inwardly between the surfaces 22 and 30 is rerouted into a circumferentially extending annular space or gap, indicated generally at 46, which is defined between the surfaces 38A and 40A because this space of the annular gap 46 remains at zero gage pressure until it is filled with any of expanding foam adhesive material 34. While the annular space 46 between the surfaces 38A and 40A is filling, the foam adhesive material 34 is curing.

In this embodiment, by creating an appropriate or preselected volume for the annular space 46 between the surfaces 38a and 40A, any of the foam adhesive material 34 that enters the annular gap 46 will preferably cure and stop expanding before completely filling the gap 46. Therefore, there is no impetus to force the foam adhesive material 34 past the gap 46. Thus, this feature of the illustrated embodiment will preferably eliminate any secondary operations, and their related costs, such as having to create a seal or use a gasket in this area of the vehicle wheel during assembly of the wheel cover 30 to the vehicle wheel 10. Alternatively, the shape, construction, arrangement, number, orientation and/or make-up of the shoulder 38 of the wheel 10 and/or the rib 40 of the cover 30 may be other than illustrated, in order to produce a desired serpentine path, if so desired. Additionally, in the illustrated embodiment, another gap or space, indicated generally at 48, is provided between the surfaces 38B and 40B. Preferably, the foam adhesive material 34 is captured and retained in the gap 46; however, in some instances, the gap 48 may also contain some of the foam adhesive material 34.

For example, as shown in the embodiment illustrated in FIG. 4 and using like reference numbers to indicate like parts, there is illustrated an alternate embodiment of the vehicle wheel 10. As shown therein, in this embodiment a narrow generally U-shaped annular trough or recess, indicated generally at 44, is provided in the inner mounting surface 18 in the wheel hub area 36 of the vehicle wheel 10. The recess 44 includes a generally extending side wall 44A and a generally radially extending curved or radiused surface 44B. Preferably, as shown in the illustrated embodiment, the rib 40 of the wheel cover 30 is positioned adjacent to or near to the side wall surface 44A of the recess 44 thereby producing an indirect path. Also, as shown in the illustrated embodiment, the remote end 40A of the rib 40 is preferably spaced apart from contact with the surface 44B of the recess 44. As can be seen in this embodiment, in addition to the gap between the outboard face 22 and the inner surface 30A of the wheel cover 30, three additional gaps or spaces, indicated generally at G1, G2 and G3, are provided between the adjacent surfaces of the recess 44 and the rib 40.

Figure 5:
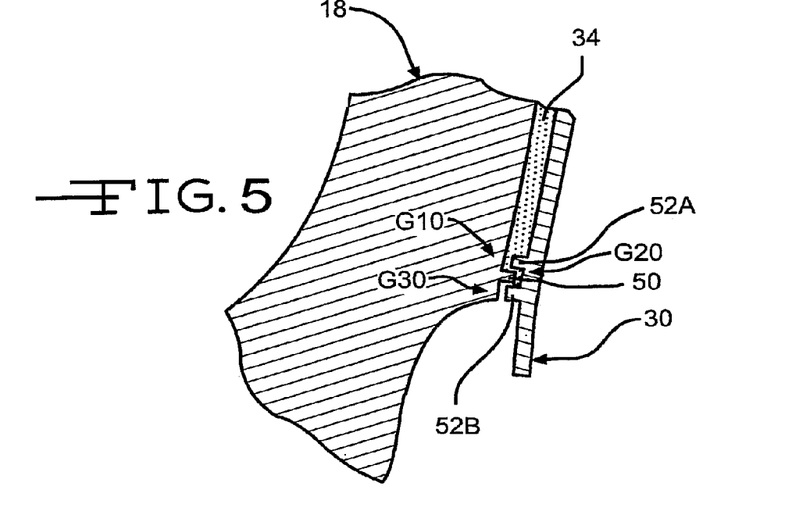
FIG. 5 is a view similar to FIG. 2 showing another alternate embodiment.

For example, as shown in the embodiment illustrated in FIG. 5 and using like reference numbers to indicate like parts, there is illustrated another alternate embodiment of the vehicle wheel 10. As shown therein, in this embodiment, a generally narrow annular protruding lug 50 is provided on the vehicle wheel 14. The lug 50 is adapted to be situated or disposed between a pair of spaced apart annular ribs 52A and 52B provided on the wheel cover 30 thereby producing an indirect path, the path being a generally inverted U-shaped path. As can be seen in this embodiment, in addition to the gap between the outboard face 22 and the inner surface 30A of the wheel cover 30, at least three additional gaps or spaces, indicated generally at G10, G20 and G30, are provided between the adjacent surfaces of the lug 50 and the ribs 52A and 52B.

Figure 6:
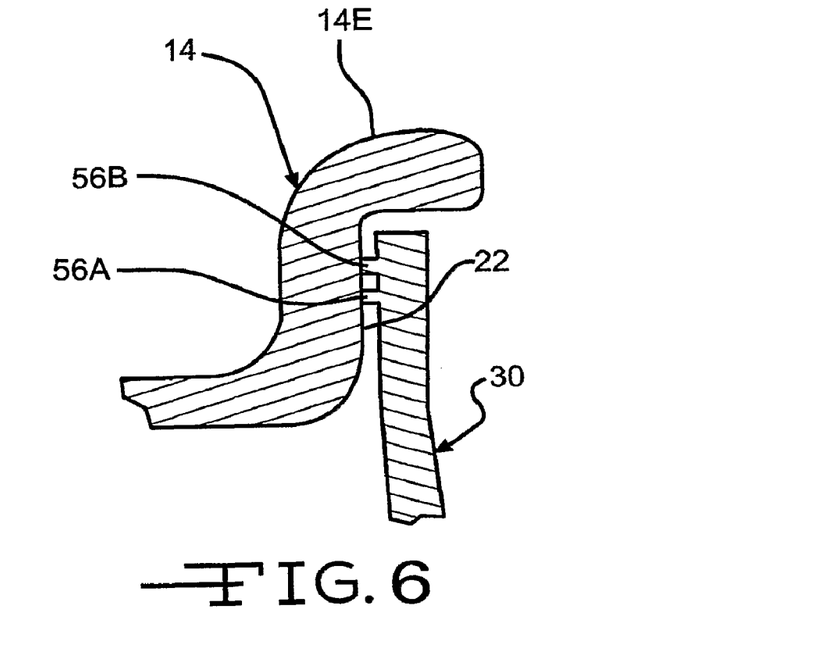
FIG. 6 is an enlarged view of a portion of the vehicle wheel illustrated in FIG. 1, the vehicle wheel being shown without any adhesive present.
Figure 7:
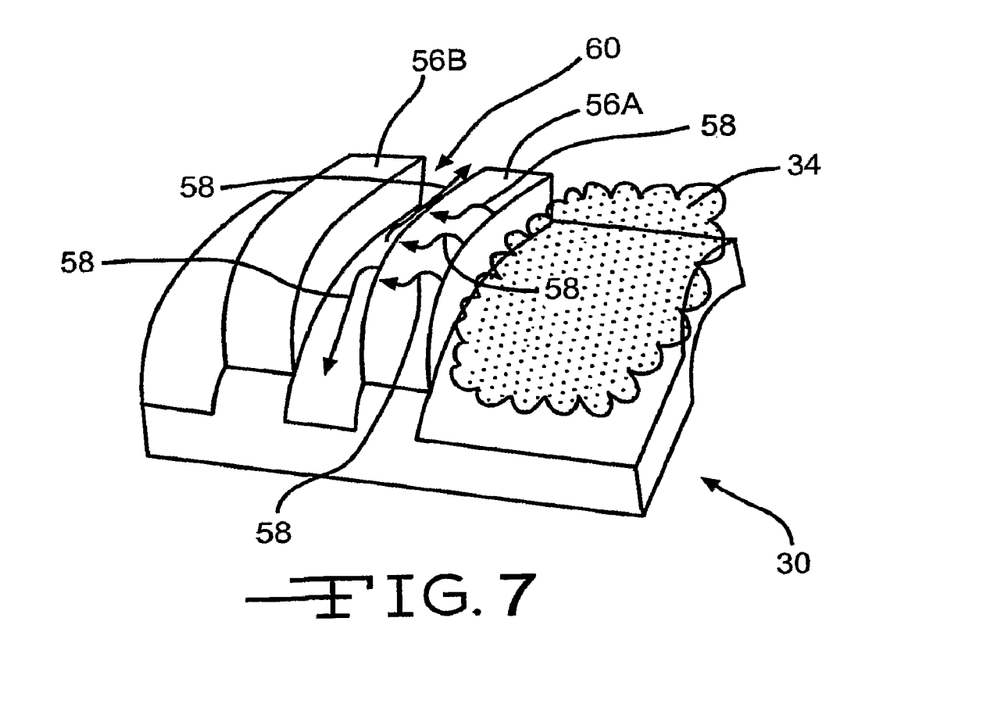
FIG. 7 is an enlarged view of portion of the vehicle wheel illustrated in FIG. 2, with the vehicle wheel being removed.

As best shown in FIG. 6, a different situation exists at the outboard face 22A of vehicle wheel 10 in the area of the outboard tire bead seat retaining flange 14E. In this area, the wheel cover 30 will preferably contact the outboard face 22 of the vehicle wheel 10 directly as this is a datum or reference point for both of the parts. During the assembly process, the parts are temporarily clamped or held together by suitable means, while the foam adhesive material 34 is expanding under its own internal pressure counteracting the clamping force. It is desirable to prevent the expanding foam adhesive material 34 from squeezing through the seam or interface produced in this area. Thus, according to the illustrated embodiment shown in FIGS. 6 and 7, there is preferably provided on the wheel cover 30 two molded generally concentric, circumferentially extending spaced apart annular ribs, namely an inner rib 56A and an outer rib 56B.

In the illustrated embodiment, the two ribs 56A and 56B on the wheel cover 30 are generally identical to one another are preferably operative to mate or contact the wheel outboard face 22 which is located generally normal to the ribs 56A and 56B. As a result, as the foam adhesive material 34 is expanding, any foam adhesive material 34 that squeezes or flows past the inner rib 56A (such flow indicated by arrows 58 in FIG. 7), is then rerouted circumferentially in a circumferentially extending annular space or gap, indicated generally at 60, which is defined between the inner rib 56A and outer rib 56B because this space of the annular gap 60 remains at zero gage pressure until it is filled with any of expanding foam adhesive material 34. While the annular space 60 between the inner rib 56A and the outer rib 56B is filling, the foam adhesive material 34 is curing.

In this embodiment, by creating an appropriate or preselected volume for the annular space 60 between the ribs 56A and 56B, any of the foam adhesive material 34 that enters the annular gap 60 will cure and stop expanding before completely filling the gap 60. Therefore, there is no impetus to force the foam adhesive material 34 past the outer circumferential rib 56B. Thus, this feature of the illustrated embodiment will preferably eliminate any secondary operations, and their related costs, such as having to create a seal or use a gasket in this area of the vehicle wheel during assembly of the wheel cover 30 to the vehicle wheel 10. Alternatively, the shape, construction, arrangement, number, orientation and/or make-up of the ribs 56A and 56B of the cover 30 may be other than illustrated, in order to produce a desired serpentine path, if so desired. For example, the ribs 56A and 56B may be of different shapes and/or of different heights if so desired.

Figure 8:
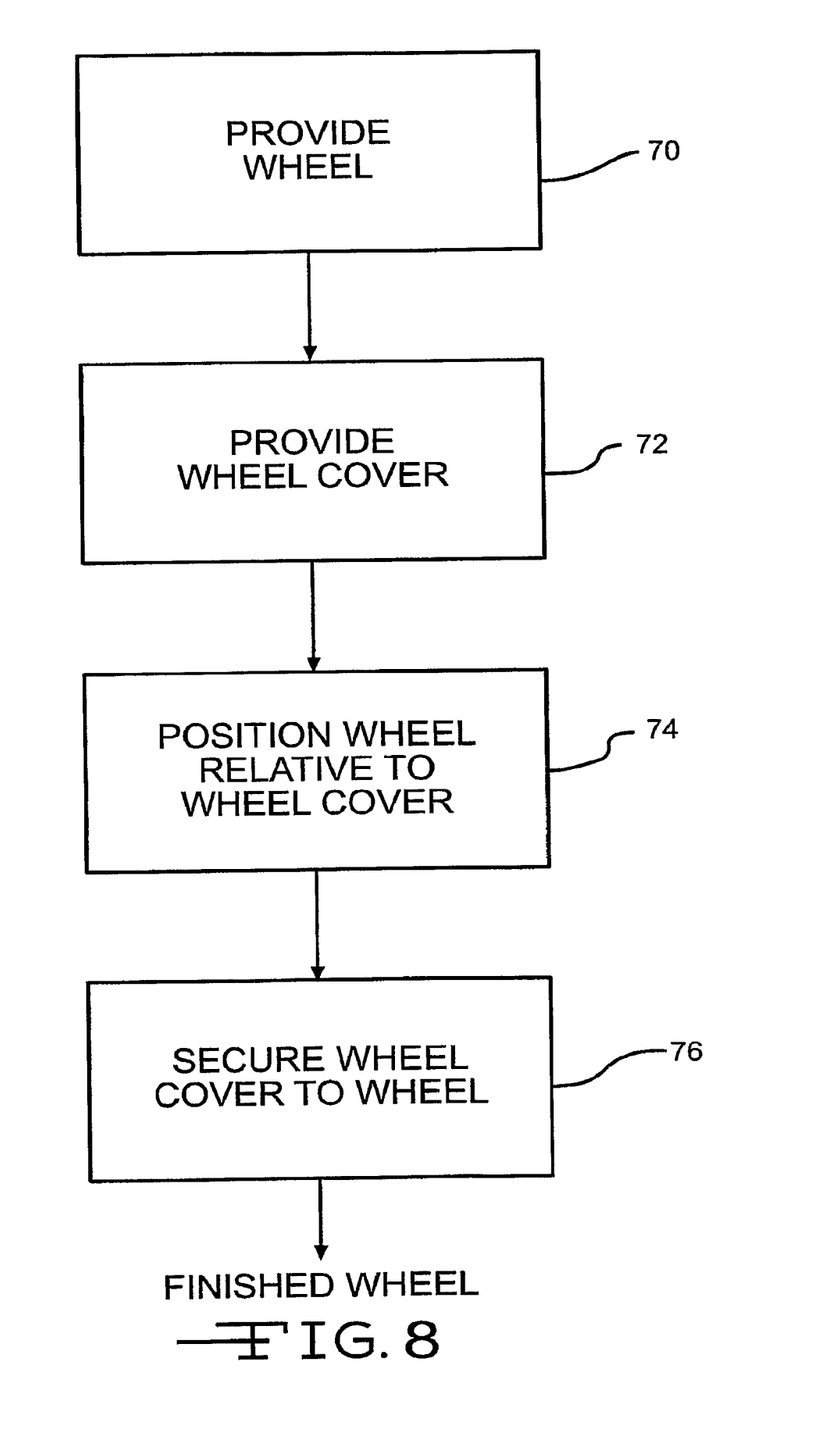
FIG. 8 is a block diagram illustrating a sequence of steps for producing the embodiments of the vehicle wheel.

A method for producing a vehicle wheel 10 may be as shown in FIG. 8. First, in step 70, a vehicle wheel, such as the vehicle wheel 70 is provided. Next, in step 72, a wheel cover, such as the wheel cover 30 is provided. In step 74, the vehicle wheel 10 and the wheel cover 30 are positioned relative to one another. Following this, in step 76, the wheel cover 30 is secured to the vehicle wheel 10 using a suitable adhesive, such as for example, the expanding foam adhesive material 34, to thereby produce the finished wheel.

As discussed above, the particular shape, construction, arrangement, number, orientation and/or make-up of the shoulder 38, recess 44, lug 50, and/or ribs 40, 56A and 56B of the wheel 10 may be other than illustrated, so as to produce a desired serpentine path. Also, in addition to the use of the expanding foam adhesive material 34, other types of adhesive materials, for example, non-expanding foam adhesive materials, may be used in conjunction with the expanding foam adhesive material 34 or in place thereof.

Also, the expanding foam adhesive material 34 and/or the non-expanding foam adhesive material can be selectively applied in a pre-assembly pattern so as to result in a full surface post-assembly pattern (shown in upper half of FIG. 2), or in a non-full surface post-assembly pattern (shown in the lower half of FIG. 2), i.e., a post-assembly pattern which has one or more voids or gaps 24 therein. Suitable types of non-expanding foam adhesives may include but are not limited to the use of one or a combination of more than one of adhesives selected from the group consisting of silicone, two-part epoxy, urethane, double-sided tape, expanding foam, and the like. Also, in addition to the expanding foam adhesive material 34, the other mechanical means, such as for example, snap tabs and fasteners, which may be part of the wheel cover 30 or separate components, may be used to assist in securing the wheel cover 30 to the vehicle wheel 10.

Also, it will be understood that other geometric shapes for the shoulder 38, recess 44, lug 50 and/or ribs 40, 56A and 56B are envisioned and that the illustrated embodiments are not limited to the specific shapes disclosed above. One skilled in the art could design other appropriate shapes to produce a desired serpentine path based on the basic shape of the associated vehicle wheel and wheel cover while considering structural performance, manufacturing and assembly and aesthetic features of the parts.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A method for producing a vehicle wheel cover retention system comprising the steps of:
   (a) providing a vehicle wheel defining an axis and formed from a suitable material and including a wheel rim and a wheel disc, the vehicle wheel including an inner wheel hub area, an outer annular portion and defining an outboard face, the wheel hub area provided with a center hub hole and a plurality of lug bolt mounting holes spaced circumferentially around the center hub hole;
   (b) providing a wheel cover formed from a suitable material and including an inner surface and an outer surface, the wheel cover extending in a generally radial direction with respect to the axis of the vehicle wheel;
   (c) providing an external surface feature on at least a portion of both of the outboard face of the vehicle wheel directly adjacent the wheel hub area thereof and the inner surface of the wheel cover, wherein the external surface feature provided on the inner surface of the wheel cover is at least one rib extending from the inner surface of the wheel cover in a generally axial direction with respect thereto and the external surface feature provided on the outboard face of the vehicle wheel includes at least a generally axially extending outboard face surface and a generally radially extending outboard face surface with respect to the axis of the vehicle wheel;
   (d) positioning the vehicle wheel and the wheel cover relative to one another such that the at least one rib is generally spaced apart from contact with the generally axially extending outboard face surface and the generally radially extending outboard face surface of the external surface feature provided on the outboard face of the vehicle wheel to thereby form a first gap between adjacent surfaces of the at least one rib and the generally axially extending outboard face surface of the external surface feature provided on the outboard face of the vehicle wheel directly adjacent the wheel hub area thereof and to form a second gap between adjacent surfaces of the at least one rib and the generally radially extending outboard face surface of the external surface feature provided on the outboard face of the vehicle wheel adjacent the wheel hub area thereof, the first gap to the second gap defining an indirect flow path; and
   (e) securing the wheel cover to the vehicle wheel by using an expandable foam adhesive material, wherein the expandable foam adhesive material initially fills selected portions of the first gap and then follows the indirect flow path to then flow into the second gap whereby the expanding adhesive foam material cures and stops expanding before completely filling the second gap and flowing into the wheel hub area of the vehicle wheel.

2. The method of claim 1 wherein the external surface feature provided on the outboard surface of the vehicle wheel in step (c) is a shoulder.

3. The method of claim 1 wherein the external surface feature provided on the inner surface of the wheel cover in step (c) is a pair of circumferentially extending spaced apart annular ribs.

4. The method of claim 1 wherein the external surface feature provided on the outboard surface of the vehicle wheel in step (c) is an annular recess.

5. The method of claim 1 wherein the external surface feature provided on the outboard surface of the vehicle wheel in step (c) is a lug which is adapted to be disposed between a pair of spaced apart annular ribs provided on the inner surface of the wheel cover.

6. The method of claim 1 wherein step (d) further forms a third gap between adjacent surfaces of the at least one rib and an outboard face surface of the external surface feature provided on the outboard face of the vehicle wheel directly adjacent the wheel hub area thereof, the first gap to the second gap to the third gap defining an indirect flow path, and wherein in step (e) the expandable foam adhesive material initially fills selected portions of the first gap and then follows the indirect flow path to then flow into the second gap and then into the third gap whereby the expanding adhesive foam material cures and stops expanding before completely filling the third gap.

7. The method of claim 1 further including the steps of providing an external surface feature on at least a portion the inner surface of the wheel cover directly adjacent the outer annular portion of the outboard face of the vehicle wheel, wherein the external surface feature provided on the inner surface of the wheel cover directly adjacent the outer annular portion of the outboard face of the vehicle wheel is a pair of second ribs extending from the inner surface of the wheel cover in a generally axial direction with respect thereto, and wherein during step (d) the pair of second ribs engage the outboard face of the vehicle wheel to thereby form a third gap and a fourth gap between adjacent surfaces of the inner surface of the wheel cover and the outboard face of the vehicle wheel directly adjacent the outer annular portion thereof, the third gap to the fourth gap defining a second indirect flow path and wherein during step (e) the expandable foam adhesive material initially fills selected portions of the third gap and then follows the indirect flow path to then flow into the fourth gap whereby the expanding adhesive foam material cures and stops expanding before completely filling the third gap and flowing out beyond the outer annular portion of the vehicle wheel.

8. A vehicle wheel cover retention system comprising:

a vehicle wheel defining an axis and formed from a suitable material and including a wheel rim and a wheel disc, the vehicle wheel including an inner wheel hub area, an outer annular portion, and defining an outboard face, the wheel hub area provided with a center hub hole and a plurality of lug bolt mounting holes spaced circumferentially around the center hub hole;

a wheel cover formed from a suitable material and secured to the vehicle wheel, the wheel cover including an inner surface and an outer surface, the wheel cover extending in a generally radial direction with respect to the axis of the vehicle wheel;

wherein an external surface feature is provided on at least a portion of both of the outboard face of the vehicle wheel directly adjacent the wheel hub area thereof and the inner surface of the wheel cover, wherein the external surface feature provided on the inner surface of the wheel cover is at least one rib extending from the inner surface of the wheel cover in a generally axial direction with respect thereto and the external surface feature provided on the outboard face of the vehicle wheel includes at least a generally axially extending outboard face surface and a generally radially extending outboard face surface with respect to the axis of the vehicle wheel;

wherein the vehicle wheel and the wheel cover are positioned and secured relative to one another such that the at least one rib is generally spaced apart from contact with the generally axially extending outboard face surface and the generally radially extending outboard face surface of the external surface feature provided on the outboard face of the vehicle wheel to thereby form a first gap between adjacent surfaces of the at least one rib and the generally axially extending outboard face surface of the external surface feature provided on the outboard face of the vehicle wheel directly adjacent the wheel hub area thereof and to form a second gap between adjacent surfaces of the at least one rib and the generally radially extending outboard face surface of the external surface feature provided on the outboard face of the vehicle wheel adjacent the wheel hub area thereof, the first gap to the second gap defining an indirect flow path; and wherein the wheel cover is secured to the vehicle wheel by using an expandable foam adhesive material, wherein the expandable foam adhesive material initially fills selected portions of the first gap and then follows the indirect flow path to then flow into the second gap whereby the expanding adhesive foam material cures and stops expanding before completely filling the second gap and flowing into the wheel hub area of the vehicle wheel.

9. The vehicle wheel cover retention system of claim 8 wherein the external surface feature provided on the outboard surface of the vehicle wheel is a shoulder.

10. The vehicle wheel cover retention system of claim 8 wherein the external surface feature provided on the inner surface of the wheel cover is a pair of circumferentially extending spaced apart annular ribs.

11. The vehicle wheel cover retention system of claim 8 wherein the external surface feature provided on the outboard surface of the vehicle wheel is an annular recess.

12. The vehicle wheel cover retention system of claim 8 wherein the external surface feature provided on the outboard surface of the vehicle wheel is a lug which is adapted to be disposed between a pair of spaced apart annular ribs provided on the inner surface of the wheel cover.

13. The vehicle wheel cover retention system of claim 8 wherein there is further formed a third gap between adjacent surfaces of the at least one rib and an outboard face surface of the external surface feature provided on the outboard face of the vehicle wheel directly adjacent the wheel hub area thereof, the first gap to the second gap to the third gap defining an indirect flow path, and wherein the expandable foam adhesive material initially fills selected portions of the first gap and then follows the indirect flow path to then flow into the second gap and then into the third gap whereby the expanding adhesive foam material cures and stops expanding before completely filling the third gap.

14. The vehicle wheel cover retention system of claim 8 wherein on at least a portion the inner surface of the wheel cover directly adjacent the outer annular portion of the outboard face of the vehicle wheel there is provided a pair of second ribs extending from the inner surface of the wheel cover in a generally axial direction with respect thereto, and wherein the pair of second ribs engage the outboard face of the vehicle wheel to thereby form a third gap and a fourth between adjacent surfaces of the inner surface of the wheel cover and the outboard face of the vehicle wheel directly adjacent the outer annular portion thereof, the third gap to the fourth gap defining a second indirect flow path and wherein the expandable foam adhesive material initially fills selected portions of the third gap and then follows the indirect flow path to then flow into the fourth gap whereby the expanding adhesive foam material cures and stops expanding before completely filling the third gap and flowing out beyond the outer annular portion of the vehicle wheel.

15. A method for producing a vehicle wheel cover retention system comprising the steps of:

(a) providing a vehicle wheel formed from a material selected from the group consisting of steel and aluminum and defining an axis and including a wheel rim and a wheel disc, the vehicle wheel including an inner wheel hub area, an outer annular portion and defining an outboard face, the wheel hub area provided with a center hub hole and a plurality of lug bolt mounting holes spaced circumferentially around the center hub hole;

(b) providing a wheel cover formed from a material selected from the group consisting of plastic and steel and including an inner surface and an outer surface, the wheel cover extending in a generally radial direction with respect to the axis of the vehicle wheel;

(c) providing an external surface feature on at least a portion of both of the outboard face of the vehicle wheel directly adjacent the wheel hub area thereof and the inner surface of the wheel cover, wherein the external surface feature provided on the inner surface of the wheel cover is at least one rib extending from the inner surface of the wheel cover in a generally axial direction with respect thereto and the external surface feature provided on the outboard face of the vehicle wheel includes at least a generally axially extending outboard face surface and a generally radially extending outboard face surface with respect to the axis of the vehicle wheel;

(d) positioning the vehicle wheel and the wheel cover relative to one another such that the at least one rib is generally spaced apart from contact with the generally axially extending outboard face surface and the generally radially extending outboard face surface of the external surface feature provided on the outboard face of the vehicle wheel to thereby form a first gap between adjacent surfaces of the at least one rib and the generally axially extending outboard face surface of the external surface feature provided on the outboard face of the vehicle wheel directly adjacent the wheel hub area thereof and to form a second gap of the at least one rib and the generally radially extending outboard face surface of the external surface feature provided on the outboard face of the vehicle wheel adjacent the wheel hub area thereof, the first gap to the second gap defining an indirect flow path; and (e) securing the wheel cover to the vehicle wheel by using an expandable foam adhesive material, wherein the expandable foam adhesive material initially fills selected portions of the first gap and then follows the indirect flow path to then flow into the second gap whereby the expanding adhesive foam material cures and stops expanding before completely filling the second gap and flowing into the wheel hub area of the vehicle wheel.

16. The method of claim 15 wherein the external surface feature provided on the outboard surface of the vehicle wheel in step (c) is a shoulder.

17. The method of claim 15 wherein the external surface feature provided on the inner surface of the wheel cover in step (c) is a pair of circumferentially extending spaced apart annular ribs.

18. The method of claim 15 wherein the external surface feature provided on the outboard surface of the vehicle wheel in step (c) is an annular recess.

19. The method of claim 15 wherein the external surface feature provided on the outboard surface of the vehicle wheel in step (c) is a lug which is adapted to be disposed between a pair of spaced apart annular ribs provided on the inner surface of the wheel cover.

20. The method of claim 15 wherein step (d) further forms a third gap between adjacent surfaces of the at least one rib and an outboard face surface of the external surface feature provided on the outboard face of the vehicle wheel directly adjacent the wheel hub area thereof, the first gap to the second gap to the third gap defining an indirect flow path, and wherein in step (e) the expandable foam adhesive material initially fills selected portions of the first gap and then follows the indirect flow path to then flow into the second gap and then into the third gap whereby the expanding adhesive foam material cures and stops expanding before completely filling the third gap.

* * * * *

UNITED STATES PATENT AND TRADEMARK OFFICE
CERTIFICATE OF CORRECTION

| | | |
|---|---|---|
| PATENT NO. | : 7,891,744 B2 | Page 1 of 1 |
| APPLICATION NO. | : 12/161993 | |
| DATED | : February 22, 2011 | |
| INVENTOR(S) | : Peter Yee et al. | |

It is certified that error appears in the above-identified patent and that said Letters Patent is hereby corrected as shown below:

On the Title Page, Related U.S. Application Data has been omitted.

The following patent information should then be inserted under that heading:
-- (60)   Provisional application No. 60/764,615, filed Feb. 2, 2006. --

Signed and Sealed this

Nineteenth Day of April, 2011

David J. Kappos
*Director of the United States Patent and Trademark Office*